Figure 1:
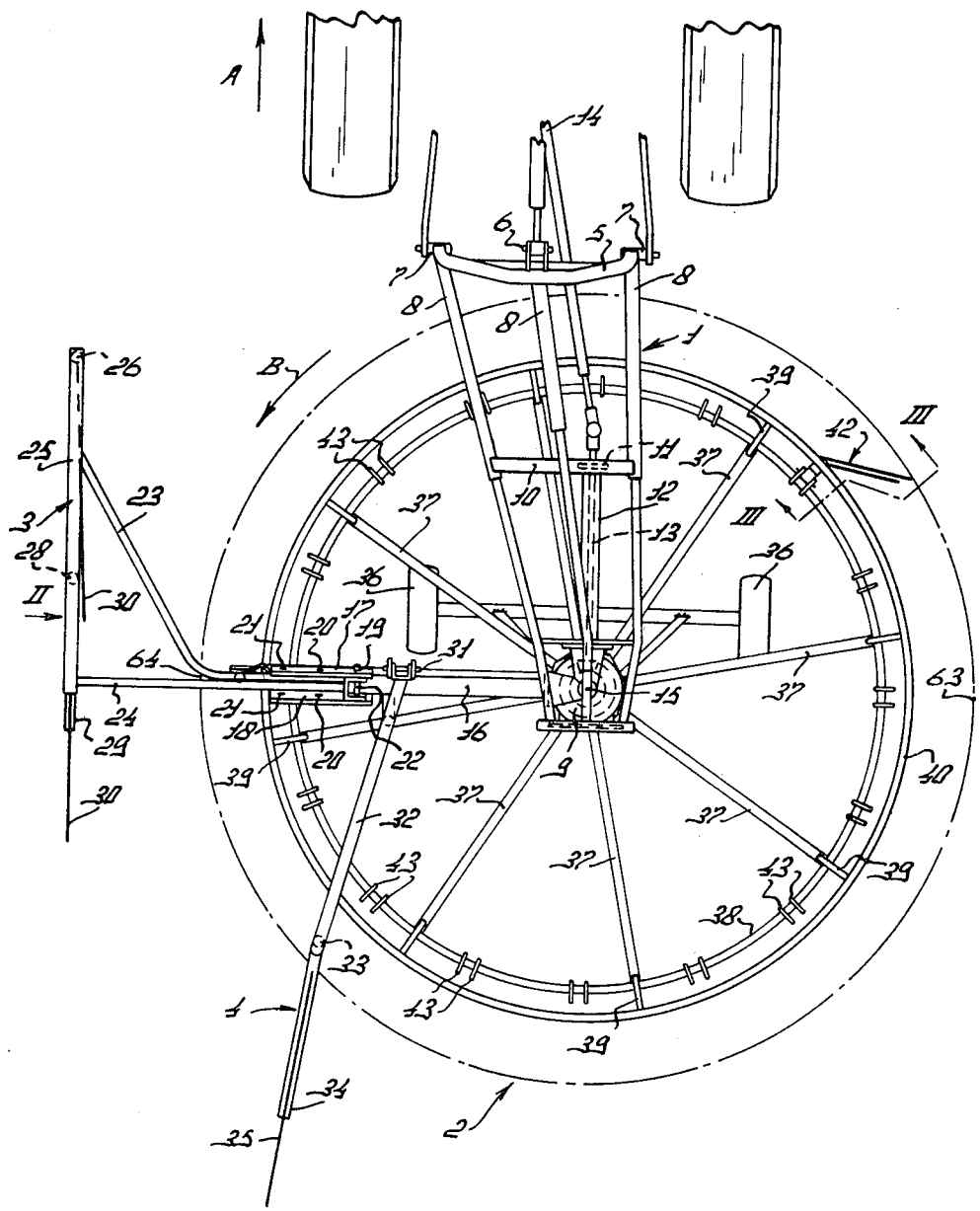

United States Patent [19]

van der Lely et al.

[11] 4,330,986

[45] May 25, 1982

[54] RAKING MACHINES

[75] Inventors: Ary van der Lely, Maasland; Cornelis J. G. Bom, Rozenburg, both of Netherlands

[73] Assignee: C. Van der Lely N.V., Maasland, Netherlands

[21] Appl. No.: 199,555

[22] Filed: Oct. 22, 1980

[30] Foreign Application Priority Data

Oct. 23, 1979 [NL] Netherlands .......................... 7907777
Jan. 18, 1980 [NL] Netherlands .......................... 8000327
Aug. 27, 1980 [NL] Netherlands .......................... 8004832

[51] Int. Cl.³ .......................................... A01D 78/14
[52] U.S. Cl. ....................................... 56/377; 56/370
[58] Field of Search .......................... 56/370, 377, 400

[56] References Cited

U.S. PATENT DOCUMENTS

| | | | |
|---|---|---|---|
| 3,645,077 | 2/1972 | Hauser-Liehard | 56/377 |
| 3,910,020 | 10/1975 | Spindler | 56/377 |
| 3,975,892 | 8/1976 | Hellkuhl | 56/365 |
| 3,992,862 | 11/1976 | van der Lely et al. | 56/370 |
| 4,023,335 | 5/1977 | van der Lely | 56/370 |
| 4,048,793 | 9/1977 | van der Lely | 56/370 |
| 4,145,866 | 3/1979 | Zweegers | 56/400 |
| 4,148,176 | 4/1979 | van der Lely | 56/370 |
| 4,202,160 | 5/1980 | van der Lely | 56/370 |
| 4,208,863 | 6/1980 | van der Lely | 56/377 |

FOREIGN PATENT DOCUMENTS

| | | |
|---|---|---|
| 2309007 | 8/1974 | Fed. Rep. of Germany ........ 56/370 |
| 2536893 | 8/1975 | Fed. Rep. of Germany ........ 56/370 |
| 2517464 | 10/1975 | Fed. Rep. of Germany ........ 56/370 |
| 2517651 | 10/1975 | Fed. Rep. of Germany ........ 56/370 |
| 2607072 | 9/1976 | Fed. Rep. of Germany ........ 56/370 |
| 2836340 | 3/1979 | Fed. Rep. of Germany ........ 56/370 |
| 1379583 | 1/1975 | United Kingdom .................. 56/377 |
| 1502627 | 3/1978 | United Kingdom .................. 56/370 |

*Primary Examiner*—Paul J. Hirsch
*Attorney, Agent, or Firm*—William B. Mason

[57] ABSTRACT

A raking machine has at least one circular tined rake member that is rotatable about an upwardly and forwardly inclined axis of rotation. The tines are pivotably mounted on the outer perimeter of the rake member to turn about horizontal pivot axes. Preferably, the diameter of the rake member is defined by the path described by the tips of the tines in operation and is 2 to 3.3 meters. During operation, the tines, viewed in plan are directed outwardly from the perimeter and rearwardly with respect to the direction of rotation so that with travelling speeds over the ground between 6 and 12 kms/hour and when the member is driven at a speed of rotation of 80 rev/min., the tine at the front of the rake member at any moment extends at an angle of about 45° to 90°, again viewed in plan, to a line passing through the tip of that tine and tangential to the path of the tine tip with respect to the ground, when the tine tip is located in a vertical plane containing the rotary axis of the rake member and extending in the direction of travel of the machine over the ground. Such a raking machine, with a large diameter rake member, achieves satisfactory raking results within a broad range of travelling speeds, particularly on uneven soil.

24 Claims, 10 Drawing Figures

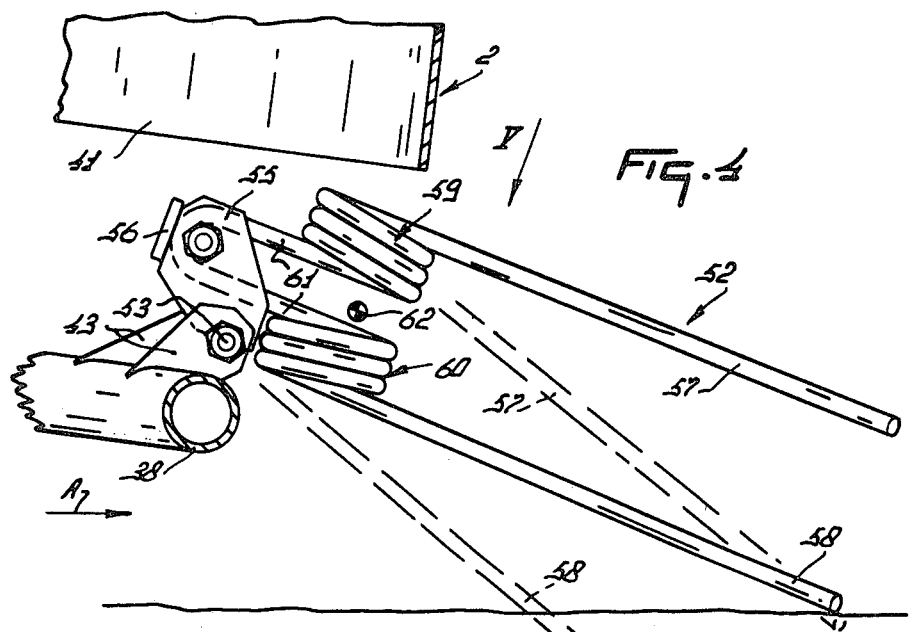
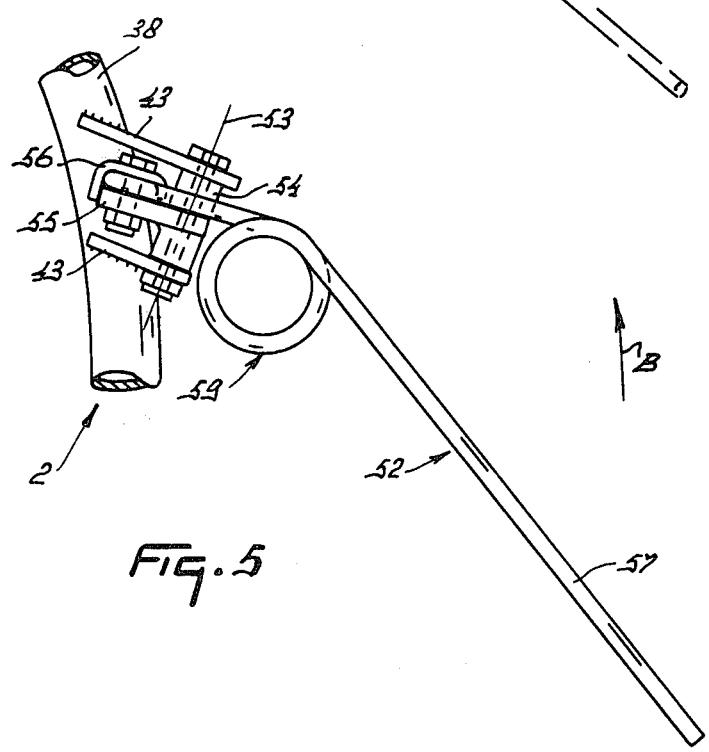

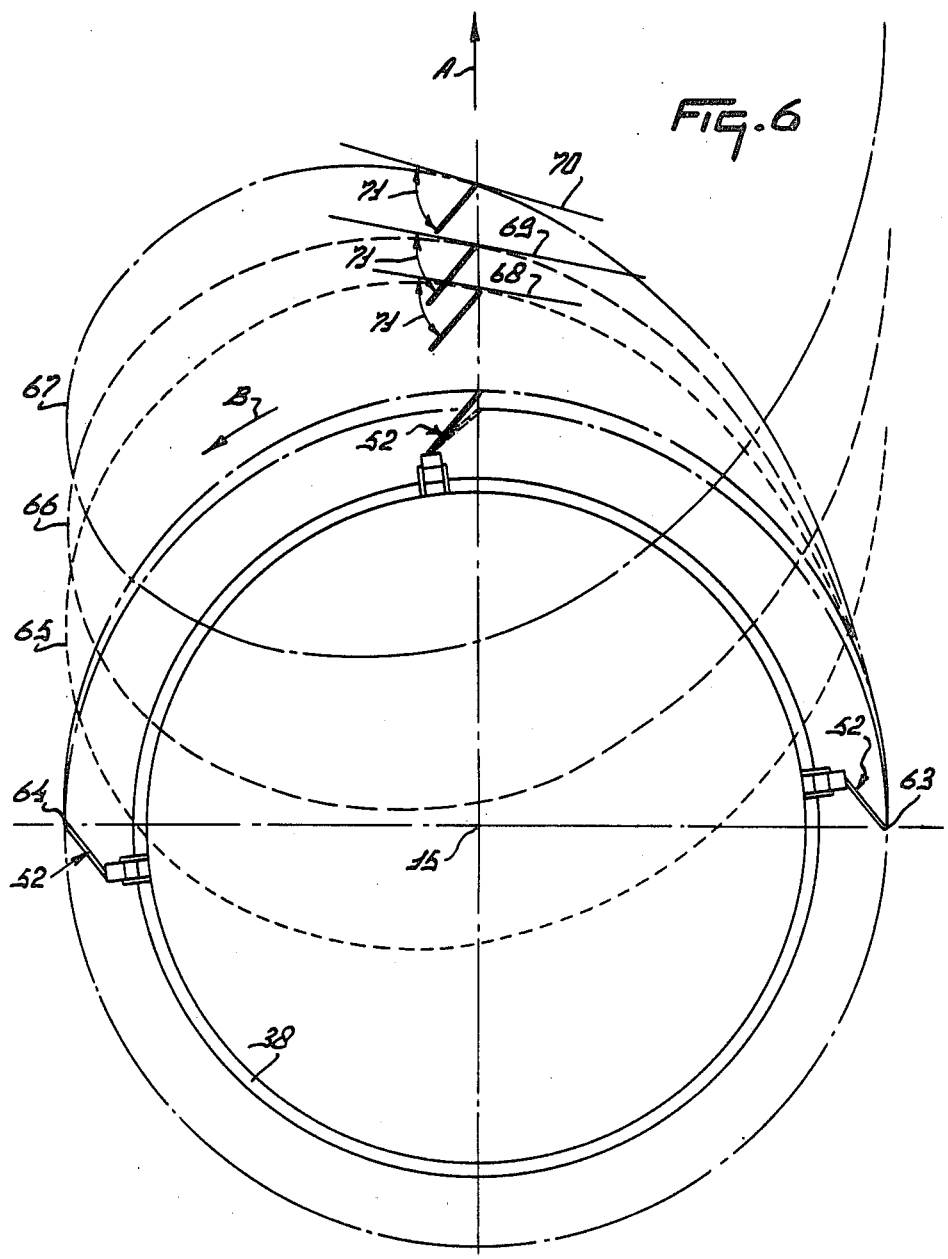

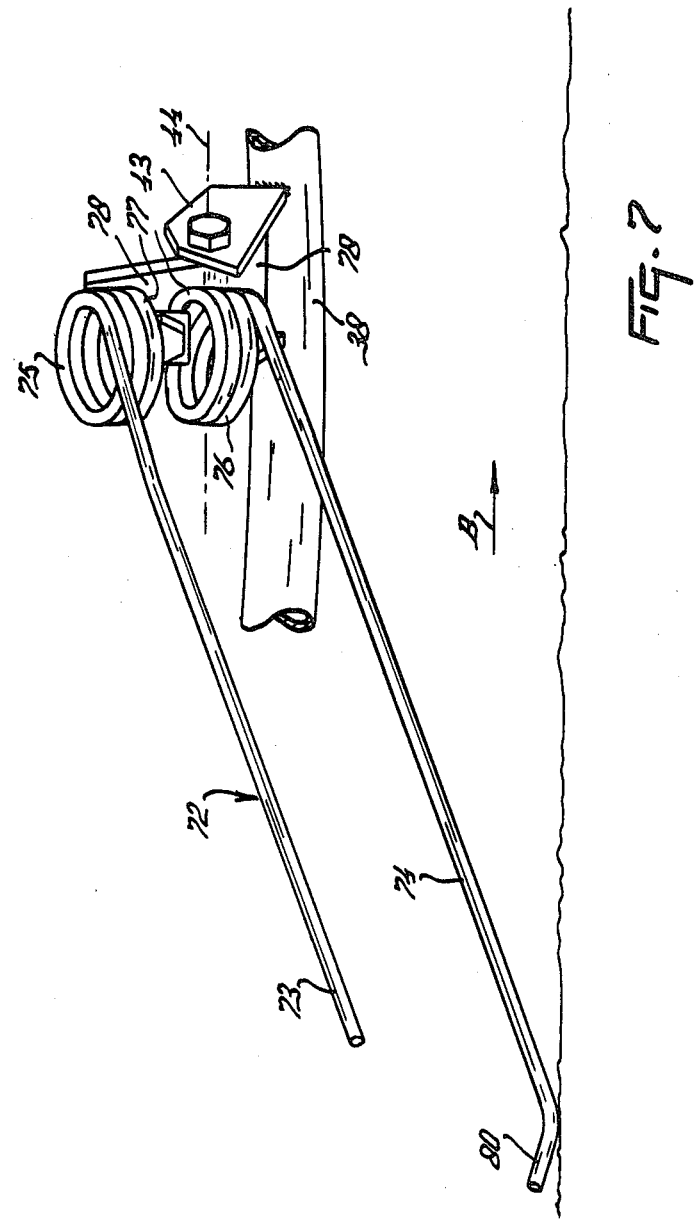

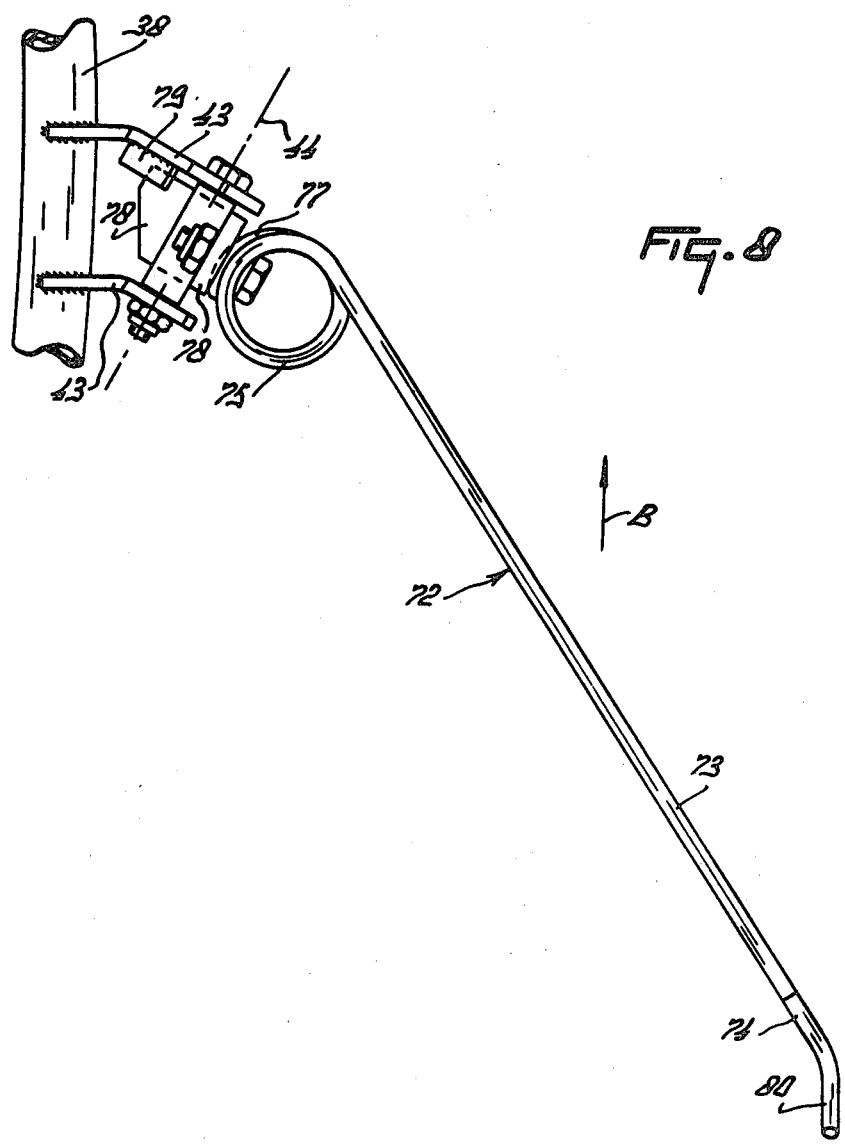

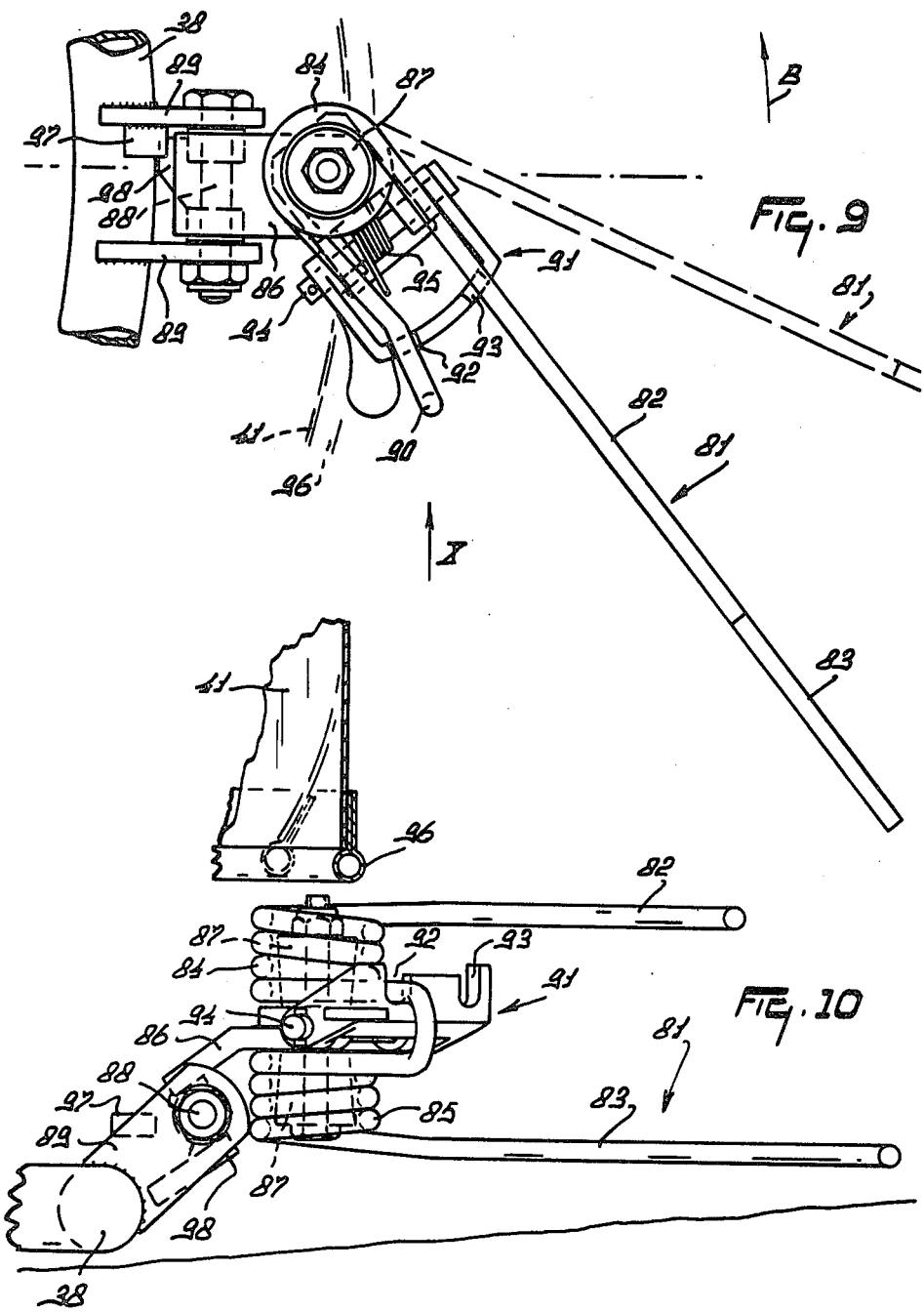

4,330,986

RAKING MACHINES

This invention relates to raking machines. It is particularly concerned with raking machines comprising at least one tined rake member which can be driven, from a tractor or other vehicle that propels the machine over the ground, to rotate about a forwardly upwardly inclined axis, the tines of the rake member being pivotable about pivot axes with respect to the remainder of the rake member.

According to the present invention there is provided a raking machine comprising at least one tined rake member rotatable about an upwardly and forwardly inclined axis of rotation, the tines being pivotable with respect to the remainder of the rake member about pivot axes; the diameter of the rake member at the path described by the tips of the tines in operation being 2 to 3.3 meters; the tines viewed in plan being directed outwardly and rearwardly with respect to the direction of rotation of the rake member to an extent such that with travelling speed over the ground between 6 and 12 kms/hour and a speed of rotation of the rake member between 70 and 80 rev/min the tine at the front of the rake member at any moment is at an angle of about 45° to 90°, viewed in plan, to a line passing through the tip of the tine and tangential to the path of the tine tip with respect to the ground, when the tine tip is located in a vertical plane containing the rotary axis of the rake member and extending in the direction of travel of the machine over the ground. Such a raking machine, by utilising a large diameter rake member, achieves satisfactory raking results within a broad range of travelling speeds, particularly on uneven soil.

Figure 2:
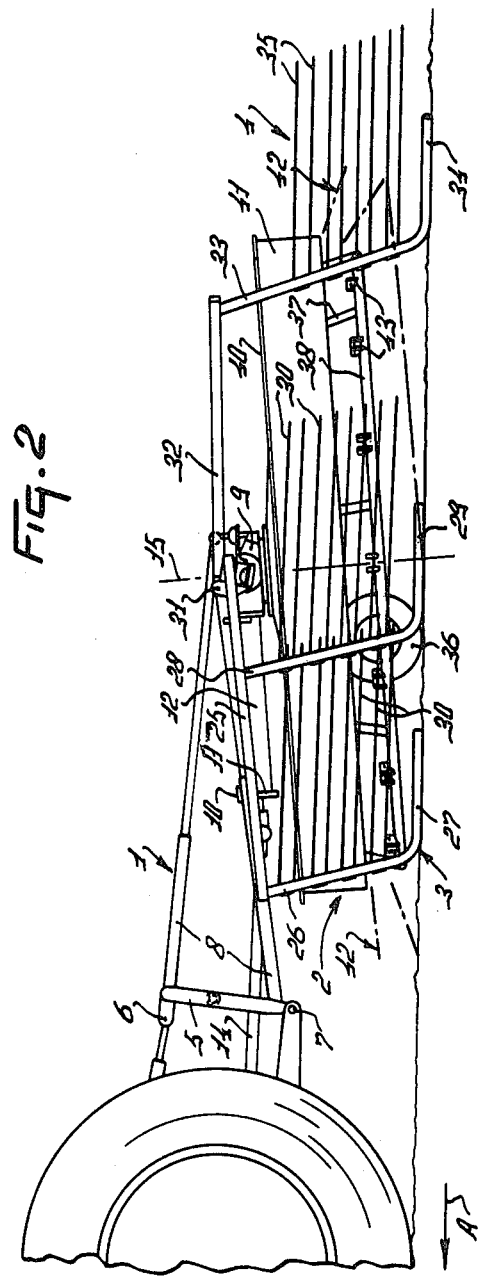
Figure 3:
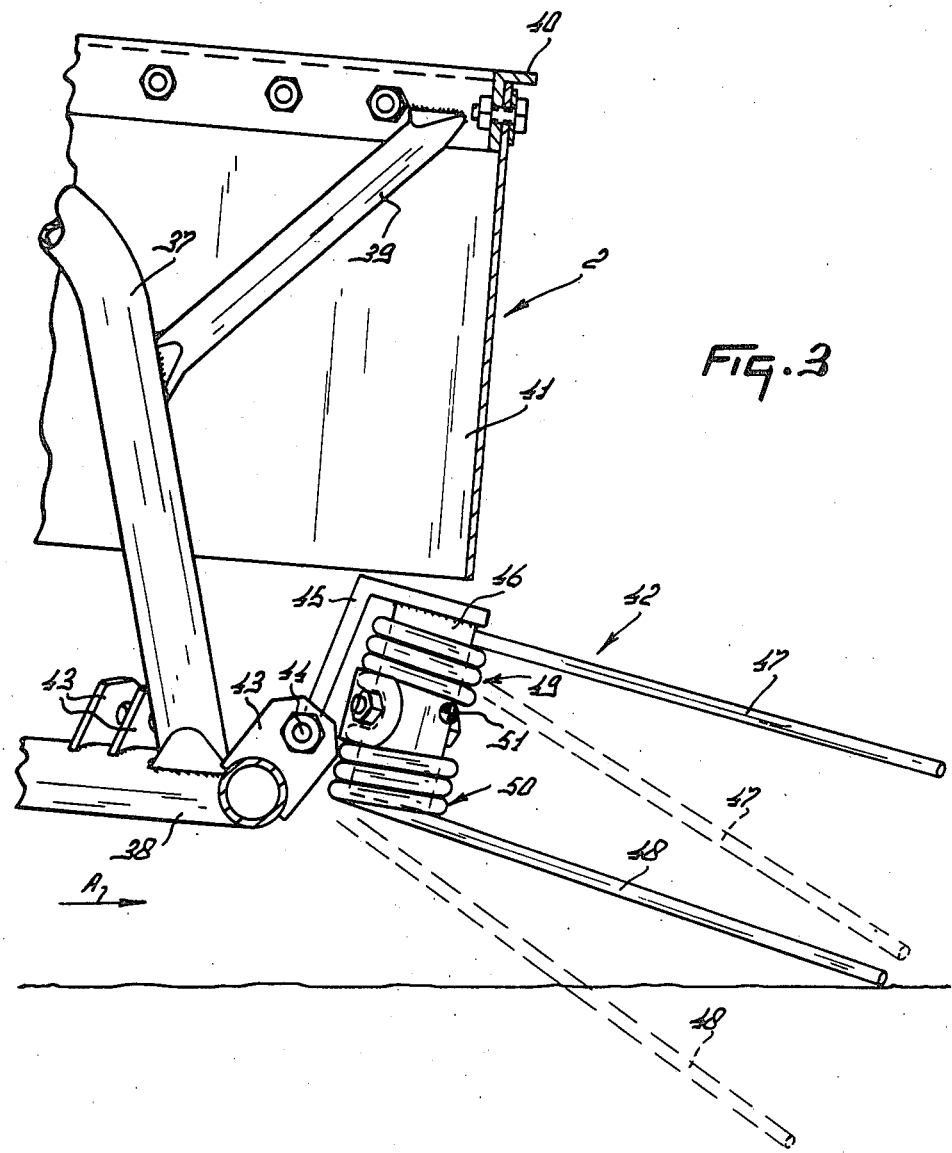

For a better understanding of the invention and to show how the same may be carried into effect reference will now be made, by way of example, to the accompanying drawings, in which:

FIG. 1 is a plan view of a raking machine,

FIG. 2 is a side view of the machine taken in the direction of arrow II in FIG. 1, FIG. 3 is a side view partly in section on line III—III in FIG. 1 showing a group of tines and the raking machine, FIG. 4 is a sectional view as if taken on the line III—III in FIG. 1, but of an alternative embodiment of a group of tines, FIG. 5 is a plan view of the group of tines of FIG. 4, taken in the direction of arrow V in FIG. 4, FIG. 6 is a schematic plan view illustrating the paths described in operation by the tips of tines of tine groups such as those of FIGS. 3 to 5, the relevant angles of incidence of the tines to the crop also being illustrated, FIG. 7 is a perspective view of an alternative embodiment of a group of tines, FIG. 8 is a plan view of the group of tines of FIG. 7, FIG. 9 is a plan view of an example of an adjustable tine attachment, and FIG. 10 is a side view taken in the direction of arrow X in FIG. 9.

The raking machine of FIGS. 1 to 3 has a frame 1, a rake member 2 and crop guide members 3 and 4.

The frame 1 includes a trestle 5 of inverted U formation having at the top a coupling 6 and near each of the two lower ends a coupling 7 for hitching the machine to the three-point lifting device of a tractor. To the two sides and also to the rear of the top of the trestle 5 are rigidly secured carriers 8 which extend to the rear and which are rigidly secured near their rear ends to a gear box 9 for driving the rake member 2. The carriers 8 are interconnected about midway their length by means of a rigid coupling piece 10, to the underneath of which is fastened an extension arm 11. This arm 11 carries the front end of a tube 12, the rear end of which is rigidly secured to the gear box 9. The tube 12 encloses the input shaft of the gear box. This input shaft is prolonged forwardly by a drive shaft 13, which is located in the tube 12 and which is supported, near the extension arm 11, in the tube 12. The foremost end of the drive shaft 13 emerging from the tube 12 is connected by a universal coupling with an auxiliary shaft 14 which is drivably connected at the front end with the power take-off shaft of a tractor drawing the raking machine.

In the gear box 9 the rake member 2 is rotatable about an upwardly extending axis of rotation 15, which is inclined at an angle of about 3° to 7° to the vertical, to the front in the direction from bottom to top of the rake member and with respect to the direction of forward travel A of the machine over the ground. During operation the rake member is moved over the ground in the direction of forward travel A, and is driven in the direction of rotation B (FIG. 1).

To the gear box 9 is rigidly secured a tubular extension arm 16 which extends horizontally and transversely of the direction of travel A towards a region where the rake member 2 ejects crop in operation. Along the front and rear of the outermost part of the extension arm 16 are rigidly fastened supporting plates 17 and 18 respectively, each of which has three relatively spaced holes 19, 20 and 21, the centre lines of corresponding holes in the plates 17 and 18 being pairwise registering. Through one pair of these holes is passed a pivot shaft 22, about which parallel portions of two rigidly interconnected carriers 23 and 24 are freely pivotable. From FIG. 1 it will be seen that the rear carrier 24 is straight, whereas the front carrier 23 is bent over near the circumference of the rake member 2 to extend forwardly inclined outwardly. To the ends of the carriers 23 and 24 remote from the rake member is fastened the guide member 3.

The crop guide member 3 extends, viewed in plan, substantially parallel to the direction of travel A and is freely pivotable with respect to the frame 1 about the pivot shaft 22. Viewed in plan, the pivot shaft 22 is also parallel to the direction of travel A, but viewed from the side it is inclined upwardly forwardly at an angle of about 10° to a horizontal plane. It is thus ensured that during a run across uneven soil the crop guiding member 3 can more readily match unevennesses of the ground than would be the case if the pivot shaft 22 were horizontal.

In accordance with the quantity of crop to be worked per unit time the distance between the crop guide member 3 and the rake member 2 can be adjusted by inserting the pivot shaft 22 into a selected pair of the pairs of holes 19, 20, 21.

In a side view (FIG. 2) the crop guide member 3 extends approximately from the front of the rake member 2 to a point that is at a distance behind the rotary axis 15. The guide member 3 essentially consists of two parts, which are both fastened to a substantially horizontal carrying beam 25 located at the top of the guide member. The supporting beam 25 is supported at relatively spaced zones by the ends of the carriers 23 and 24, to which it is rigidly secured.

The front end of the supporting beam 25 has fastened to it a downwardly and rearwardly inclined support 27, which bears on the ground during operation. At a distance behind the support 26 is fastened, in an analogous manner, a support 28, which is also downwardly and rearwardly inclined and changes via a rounded-off part into a support 29, which is directed horizontally to the rear and which also bears on the ground during operation. From FIG. 2 it will be seen that the supports 26, 27 and 28, 29 respectively have substantially identical shapes. These supports extend substantially parallel to a vertical plane. Each of the supports 26, 28 has fastened to it a plurality of substantially horizontal, rearwardly freely extending spring steel bars 30, which extend to the rear away from the support 26 and 28 respectively and which constitute a substantially vertical face which brushes past the outer side of a swath to be formed during operation of the machine. The bars 30 fastened to the support 26 have such a length that the free, rear ends of these bars (FIG. 2) extend beyond the rear of the support 28. Viewed in plan, these free ends of this front group of bars 30 are, of course, located on the side of the support 28 facing the rake member 2. The free ends of the rear group of bars 30 fastened to the support 28 are located, in side view (FIG. 2) approximately midway between the rotary axis 15 and the rear of the rake member 2. Since with regard to the size of the rake member, a comparatively long crop guide member is desired, and the advantages of guide walls formed by spring steel bars should be maintained, the bars are arranged in two groups, thus avoiding excessive vibrations of long bars. The bars of the front group can bear on the support 28 at least during operation.

The extension arm 16 is furthermore provided midway along its length with a horizontal pivot shaft 31 extending, viewed in plan, substantially at right angles to the direction of travel A, about which shaft a tubular extension arm 32 is freely pivotable (FIGS. 1 and 2). This arm 32 is rearwardly and outwardly inclined away from the extension arm 16 with respect to the pivot shaft 31 to substantially perpendicularly above the path described by the tips of the tines of the rake member 2. To the rear end of the extension arm 32 is fastened a downwardly and rearwardly inclined support 33 (FIG. 2) of the guide member 4, which support changes at the bottom via a rounded-off part into a horizontal, rearwardly extending support 34, which bears on the ground during operation. The support 33, like the supports 26 and 28, is provided with a plurality of superjacent spring steel bars 35 freely extending to the rear, which constitute a substantially vertical wall for a swath brushing past the outer side of the group of bars 35.

Viewed in plan, the bars 35 of the guide member 4 are at an angle of about 10° to a vertical plane containing the rotary axis 15 and that is parallel to the direction of travel A. Viewed in the direction of travel A the free ends of the bars 35 substantially coincide with the side of the tine bearing rigid part of the rake member 2 facing the member 3.

During transport of the machine the guide members 3 and 4 can be tilted up about the pivot shafts 22 and 31 to an extent such that they are located above the rake member 2.

The machine is supported by two caster ground wheels 36, which are arranged beneath the rake member 2 in the region in front of the rotary axis 15. The ground wheels 36 are adjustable in a direction of height.

The hub of the rake member 2, located beneath the gear box 9, has fastened to it eight spokes 37 directed radially, viewed in plan, and evenly distributed around the circumference of the rake member. These spokes are bent over in downwardly and outwardly inclined positions near the ends remote from the hub, the outermost ends carrying a tubular arm 38 (FIGS. 1 and 3), which is circular and coaxial with the rotary axis 15. The center line of the rim 38 is located in a plane at right angles to the rotary axis 15. As will be seen from FIG. 3, each spoke 37 has rigidly secured to it near the downward bend an upwardly and outwardly inclined supporting bar 39 extending radially, viewed in plan. The ends of the supporting bars 39 remote from the spokes 37 are rigidly secured to a circular rim 40, which is also coaxial with the rotary axis 15 and is in a plane parallel to the plane of the rim 38. The rim 40, located at a distance above the rim 38, serves for mounting a flexible wall 41, which extends downwards away from the rim 40. The lower edge of the flexible wall 41 is unsupported and is located approximately at the level of the top of the groups of tines to be described hereinafter. The wall 41 has a cylindrical shape and is coaxial with the rotary axis 15. The wall 41 may be made from rubber, canvas or synthetic resin and is preferably reinforced by fabric. The diameters of the rim 40 and of the wall 41 are about 10% larger than that of the rim 38 so that, viewed in plan, the tine fastening parts are located wholly or partly inside the wall 41.

To the circumference of the rim 38 are fastened sixteen groups of tines 42 at equal intervals. For this purpose at the zone of each group of tines 42 two relatively parallel support plates 43 are rigidly secured to the rim 38 (FIG. 3). Each pair of support plates 43 has registering holes having a center line 44. The associated group of tines 42 is pivotable, preferably freely pivotable, about the center line 44. The term "freely pivotable" is to be understood herein to mean that the group of tines is solely subjected to inertia forces and to ground and crop forces. It is, however, also possible to use a spring structure loading the group of tines in upward or downward direction.

Through the holes in the supporting parts 43 is passed a shaft whose center line coincides with the center line 44. About this shaft is pivotable a sleeve to which is fastened a support plate 45, which is upwardly and outwardly inclined in the operative position of the tine group and which is bent over outwardly at the top. To the bottom of the outwardly directed top part of the support plate 45 is welded a cylindrical (sleeve-like) tine carrier 46, which extends downwards away from the top part of the support plate 45. The tine carrier 46 is provided with two spring steel tines 47 and 48 forming a pair of tines making up the group 42 and being located substantially perpendicularly one above the other. The configuration of each spring steel tine 47 and 48 changes in known manner into a plurality of loops 49 and 50 respectively, which surround the tine carrier 46. A tie part of the loops 49 and 50, integral with the remainder of the tines 47 and 48, is clamped by means of a bolt 51 against the outer periphery of the tine carrier 46. In the embodiment of FIG. 3 the pivot axis constituted by the center line 44 extends tangentially, that is to say, viewed in plan, this pivot axis 44 is a tangential line to the outer circumference of the rim 38 or it is parallel to such a tangential line.

The center of gravity of the group of tines 42 and the fastening parts thereof is indicated in FIG. 3 by reference numeral 51. It is located above a plane containing the pivot axis 44 and at right angles to the rotary axis 15, since the position of the group of tines 42 of FIG. 3 relates to the foremost part of the path of the tines, as will be explained more fully hereinbelow. With respect to a plane containing both the rotary axis 15 and the center line of the tine carrier 46 the tines 47 and 48 of the group 42 are located behind this plane viewed with respect to the direction of rotation B.

FIGS. 4 and 5 show a further embodiment of the groups of tines of the rake member 2. The spokes 37, the supporting bars 39, the rim 40 and the wall 41 are omitted for the sake of simplicity. The group of tines shown in FIGS. 4 and 5 is designated by reference numeral 52. The supporting parts 43 are fastened to the rim 38 in a position differing from that in the embodiment of FIG. 3 and they extend to the rear in inclined position away from the rim 38 with respect to the direction of rotation B. The registering center lines of the holes in the supporting parts 43 constitute a pivot axis 53, which is located in a plane at right angles to the rotary axis 15. Through these holes is again passed a shaft, which is enclosed in a sleeve 54. The position of the pivot axis 53 is such that the front end of the sleeve 54 is located, with respect to the direction of rotation B, at a greater distance from the rotary axis 15 than the rear end of the sleeve. As shown in FIG. 5 the pivot axis 53 is at an angle of 20° to 60°, preferably about 30°, to a tangential line to the spot concerned of the rim circumference.

As an alternative, the pivot axis 53 may not only be inclined forwardly and outwardly, with respect to the direction of rotation B, but also slightly inclined upwardly so that it is at an angle of about 5° to 15° to a plane at right angles to the rotary axis.

To the sleeve 54 is fastened a support plate 55 which is inclined upwardly and inwardly away from the pivot axis 53, as shown in FIG. 4. Near the top of this support plate 55 the group of tines 52 is clamped against the support plate 55 by means of a clamping plate 56.

The group of tines 52 consists of two tines 57 and 58 directed outwardly away from their fastening area and located approximately perpendicularly one above the other. The configuration of the tines 57 and 58 changes into coils 58 and 60 respectively and then on the proximal sides of the coils 59 and 60 into a fastening bracket 61, which interconnects the two tines and whose curved end remote from the coils 59 and 60 is clamped against the support plate 55 by the clamping plate 56 with the aid of a bolt. Viewed in plan (FIG. 5) the tines 57 and 58 are located, with respect to the direction of rotation B, behind a plane containing the rotary axis 15 and the common center line of the coils 59 and 60.

The centre of gravity of the group of tines 52 and of the fastening parts thereof is designated in FIG. 4 by reference numeral 62.

The tines 47 and 48 shown in FIG. 3 as well as the tines 57 and 58 of FIG. 4 extend outwardly and at the same time substantially parallel to one another, or they slightly diverge outwardly.

During operation the raking machine is attached by the couplings 6 and 7 to the three-point lifting device of a tractor and is moved in the direction A. The rake member 2 is driven from the power take-off shaft of the tractor by means of the auxiliary shaft 14 and the drive shaft 13 located in the tube 12, which drives the gear wheel transmission in the gear box 9, the rake member 2 being driven in the direction of rotation B with a comparatively low speed of about 70 and 80 rev/min.

Satisfactory raking results can be obtained with a diameter of the rake member 2 (measured at the path described by the tips of the tines) of 2.0 and 3.3 ms, particularly between 2.5 and 3.2 ms. Under unfavourable conditions excellent raking results have been obtained with a diameter of about 2.8 ms.

In order to obtain satisfactory raking results the speed of travel of the machine may lie between about 6 kms/hour and 12 kms/hour in dependence upon the conditions of the soil and the nature of the crop.

When the rake member 2 is driven in the direction of rotation B during a run in the direction A, the lower tines of the groups of tines come into contact with the ground and the crop approximately near the point of the tine path furthest remote from the guide member 3 (indicated by reference numeral 63 in FIGS. 1 and 6), whereas the lower tines leave the ground near the point 64 (FIGS. 1 and 6) nearest the guide member 3 of the path described by the tine tips.

The tines of each group, directed drastically to the rear, advance the crop approximately from point 63 both in the forward direction and in the direction of rotation. Heavy, wet crop leaves the group of tines owing to centrifugal force after having covered part of the path of the group of tines near the tips in the forward direction (while being braked by the stubble), after which it is again displaced by the next-following group of tines having in the meantime advanced in the forward direction. It then leaves also this group of tines and is subsequently carried along by the next-following group of tines. If the crop is comparatively dry, it is carried along over a larger distance by a group of tines. When the displaced crop has arrived at the part of the tine path facing the guide member 3, the crop leaves the tines and is deposited in the form of a swath, which is bounded on the outer side by the guide member 3, whereas the side of the swath facing the rake member 2 is flattened by the guide member 4, the crop being thus deposited in a sharply defined swath, which can be directly picked up by a baler or a pick-up wagon.

The phenomena to be described hereinbelow play an important part in displacing and depositing the crop. During the rotation of the rake member each group of tines tends to move to a position such that the center of gravity 51 (FIG. 3) or the center of gravity 62 (FIG. 4) of the group of tines and its fastening parts lies approximately in a plane containing the associated pivot axis 44 and 53 respectively and that is at right angles to the rotary axis 15. This position is attained by the centrifugal force acting on the group of tines in the region of its path in which the lowermost tine tip of the group is located freely above the ground, that is to say, in the rearmost part of the tine path. The machine is preferably set so that the tip of the lowermost tine of each group moves approximately at the level of the stubble tops near the rearmost point of its path. At this point and at all places where the tine tip is not in contact with the ground the downwardly directed lowermost tine (position indicated by broken lines in FIGS. 3 and 4) will be at an angle of about 25° to 40° to a plane at right angles to the rotary axis. Preferably this angle is about 30° to 35°.

Since the rearwardly directed position of the tines of each group of tines with respect to the direction of rotation B, as will be discussed later, varies with respect to the crop lying on the ground during a revolution of the rake member 2, this position is structurally fixed with respect to a reference position of the group of tines, in which the tines are substantially parallel to the plane at right angles to the rotary axis. Viewed in plan, the tines are in this reference position at an angle of about 35° to 70°, preferably about 45° to 65° to a plane containing the rotary axis and the center line of the coils of the group of tines concerned. Under conditions under which excellent raking results were obtained this angle was about 57°. When the tine tip is located in a vertical plane containing the rotary axis and that is parallel to the direction of travel A and when the tine tip is then bearing on the ground (the associated group of tines usually having turned (about the pivot axis 44 or 53 respectively from the reference position is downward direction) the angle between the tines of the group of tines and a plane containing the rotary axis and the center line of the coils of the group of tines is, viewed in plan, 40° to 75°, preferably about 55° to 75°, dependent inter alia upon the position of the rotary axis.

The length of the tines of each group of tines from their coils outwardly is about 35 to 40 cms.

During operation the groups of tines, as stated above, take up such a position in the rearmost part of their path, where the tines are free of the ground, that the center of gravity of each group of tines is located approximately in the plane containing the pivot axis 44 or 53 and that is orthogonal to the rotary axis 15. During its rotation in the direction B the lowermost tine of each group of tines comes into contact with the ground and the crop approximately near the point 63 indicated in FIG. 6. The point 63 is furthest remote from the guide member 3. Since the rotary axis 15 is upwardly and forwardly inclined and the pivot axis 44 or 53 gradually further approaches the ground, viewed in the direction of the foremost point of the tine path, the group of tines is compelled to turn upwardly about the pivot axis 44 or 53, while the tine tip of the lowermost tine is pressed against the ground by centrifugal force. While turning in the direction to the foremost point of the tine path the tine tip is pressed against the ground with a gradually increasing force.

With a given travelling speed, a given diameter of the rake member and a given speed of rotation of the rake member, the tip of each tine of each group describes a cycloidal path with respect to the ground. FIG. 6 shows three of such paths of the lower tines, the path 65 applying to a travelling speed of 6 kms/hour, the path 66 to a travelling speed of 9 kms/hour and the path 67 to a travelling speed of 12 kms/hour. From the shapes of these paths it will be apparent that with an increasing travelling speed these paths are deformed differently. It should particularly be noted that the tangential line (indicated for the paths 65, 66 and 67 by reference numerals 68, 69 and 70 respectively) to a point on the associated path located in a vertical plane containing the rotary axis 15 and directed in the direction of travel A is at an angle to this vertical plane which varies with increasing speed. This also means that the tine is at an angle of incidence to the crop that varies with increasing travelling speed. This angle of incidence is designated in FIG. 6 by reference numeral 71. As travelling speed increases this angle 71 becomes larger.

On the basis of an angle between the tine and a plane containing the rotary axis and the center line of the coils of the group of tines of about 57°, viewed in plan, at standstill of the rake member in the aforesaid reference position of the tine, the angle 71 is about 45° for a rake member not moved in the direction of travel A. As stated above, this angle increases with the travelling speed as a result of the varying position of the tangential line 68, 69, 70 and when the tine tip is located in the vertical plane containing the rotary axis 15 and that is directed in the direction of travel A it is about 59° at a travelling speed of 6 kms/hour, about 61° to 9 kms/hour and about 66° at 12 kms/hour.

This means that with an increasing travelling speed the angle of incidence of the tine to the crop increases in the region in which the tine tip is located near the vertical plane extending in the direction of travel A and containing the rotary axis 15. As a result, with an increasing travelling speed the tines enhance their engagement with the crop, while the crop will less readily slide off.

When a tine tip describes one of the paths 65, 66 or 67 or any one of paths intermediate therebetween, the angle of incidence of the tine to the crop, which is smallest near the point 63, increases in the direction to the foremost region of the tine path and subsequently decreases in the direction towards the point 64. This decrease between the foremost part of the tine path and the point 64 takes place fairly rapidly. This means that in the foremost part of the path the tines firmly grip the crop, whereas in the part of the tine path facing the guide member 3 the angle of incidence 71 rapidly decreases so that the crop readily slides off the tines in this area to be laid down in a swath.

Apart from the influence of the varying deformation of the tine path with an increasing speed (so that with a higher speed the crop is gradually more firmly engaged in the foremost region of the tine path) a further influence is exerted by the fact that the tines of a group, particularly the lowermost tines, moving away from point 63 towards the foremost region of the tine path, are compulsorily moved upwards while turning about the pivot axis 44 and 53 respectively. Therefore, across the part of the tine path from the point 63 to the front the tines of a group turn from a downwardly directed position, viewed from the tine fastening area, (in which they are at an angle of, for example, 30° to 35° to the plane of the rake member in the position indicated by broken lines in FIGS. 3 and 4) into a position in which the tine is at a smaller angle (about 8° to 20° in the position indicated in full lines in FIGS. 3 and 4) to the plane of the rake member, so that viewed in plan the angle 71 (FIG. 6) also increases. In the direction towards the point 64 the angle 71 decreases owing to the last-mentioned effect. This variation of the angle 71 results from the upwardly and forwardly inclined position of the rotary axis and is superimposed on the effect resulting from the deformation of the tine path due to setting of a given travelling speed.

The shape of the cycloidal tine path can be determined by the dimensionless factor Dn/v, wherein D is the diameter of the rake member relating to the circle described by the tine tips and expressed in meters, n is the speed of the rake member in terms of revolutions per minute and v is the travelling speed in meters per minute. The value of this dimensionless factor lies between 0.95 and 1.60. Preferably the raking machine is operative between values of 1.20 and 1.55 of the dimensionless factor. Very good raking results were obtained at a value of about 1.35 of this factor.

Recapitulating it can be said the raking machine described above is preferably operated in a position in which the rotary axis 15 is at an angle of 3° to 7° to the vertical, the diameter of the path described by the tine tips being 2 to 3.3 ms, preferably 2.5 to 3.2 ms and each tine being rearwardly directed with respect to the direction of rotation so that with a travelling speed lying between 6 and 12 kms/hour and a speed of rotation of 70 to 80 rev/min, in a position in which the tine tip is located in a vertical plane containing the rotary axis 15 and extending in the direction of travel A and in which the tine tip is in a foremost position with respect to the rotary axis 15, and is bearing on the ground, the tine is, viewed in plan, at an angle of about 45° to 90°, preferably 55° to 85° to a tangential line to the path of the tine tip with respect to the ground.

It should be noted that the tangential position of the pivot axis 44 (FIG. 3) is preferably used for working on flat land in the case of dense growth, the stems of the plants being at a short distance from one another. The position of the pivot axis 53 (FIG. 5), in which this pivot axis is at an angle of about 30° to a local tangential line, is preferably used on uneven land, where the crop has an irregular growth and is standing, for example, in clumps. It is furthermore to be noted that the path described by the tips of the lower tines of the groups is located in two planes i.e. in a plane behind a line between the points 63 and 64 extending to the rear in upwardly inclined position and in a plane at an angle to the first of these planes and coinciding with the plane of the ground. These two planes have a line of intersection located approximately at the line of connection between the points 63 and 64.

During operation the flexible wall 41 constitutes a wall slightly stretched by centrifugal force, that prevents crop portions of large quantities displaced per unit time from penetrating into the inner part of the rake member over and across the groups of tines 42 and 52 and also from adhering to coils and fastening parts.

The machine may be equipped with two rake members 2, which are driven in the same sense, with, in side view, the rake member furthest remote from the guide member 3 partly located in front of the other rake member with respect to the direction of travel A.

FIGS. 7 and 8 show a different embodiment of a group of tines to which the same features apply as those of the groups of tines described above. This group of tines 72 consists of an upper tine 73 and a lower tine 74 which comes into contact with the ground, the tines having coils 75 and 76 respectively, interconnected by an intermediate piece 77. A carrier formed by a curved plate 78 is fastened to the intermediate piece 77 and is freely pivotable together with the group of tines 72 about the pivot axis 44.

One of the supporting parts 43 is provided with a stop 79, which limits downward movement of the operative tine parts, since the part of the carrier 78 remote from the group of tines comes into contact with the stop 79.

The end part 80 of the tine 74 coming into contact with the ground is bent over with respect to the remainder of the tine to an extent such that, viewed in the direction to the tip of the tine and with respect to the ground this end part is upwardly inclined when the tine touches the ground. The end part 80 of the tine when located at the side of the machine is at an angle of about 10° to 25° to the ground. Viewed in plan (FIG. 8), the end part is at an angle of about 20° to 35° to the remainder of the tine when the machine is in its operative position, so that during operation the end part offers minimal obstruction to the crop sliding off the tine 74. Furthermore, when the machine is in its operative position and is moved over the field with the rake member un-driven, the tip of the tine is thus prevented from penetrating into the ground, since otherwise the turf might be damaged and the tine might be deformed. In addition, if the machine is slightly lifted by the lifting device of the tractor there is a danger that the tine located, for example, near the front of the rake member, then turning further downwards about the pivot axis 44, could also penetrate into the ground. However, the bend of the end part is such that, when this tine has reached its maximum downward deflection (determined by the contact of the carrier 78 with the stop 79) the end part, viewed in a direction towards the tip, is still upwardly inclined with respect to the ground, that is to say, at an angle of about 2° to 15°, preferably about 5° to 8°. If the machine is lifted further the tine is set free of the ground so that the risk of penetration into the ground is excluded. The smooth transition of the straight part of the tine 74 to the end part 80 ensures a smooth slide of the tine along the ground without the risk of damage to the turf and to the tine during rotation as well as when the rake member is not rotating.

The embodiment of FIGS. 9 and 10 shows a group of tines 81 having two tines 82 and 83 in superposition, the lower tine 83 being 35 to 45% longer than the upper tine 82, viewed in plan, measured from a point at the level of the center line of coils 84 and 85 connecting the tines with a tine carrier 86. As in the preceding embodiments the operative parts of the tines 82 and 83 are essentially rectilinear.

In this embodiment the fastening structure of the tines comprises two sleeves 87 located each on a different side of the tine carrier 86 and having each a frustoconical shape tapering towards the other sleeve. The proportions are chosen so that the head face of each sleeve 87 is located inside and at the level of the topmost and lowermost coils respectively of each group of coils 84 and 85 respectively. The head face is located centrally within the inner boundary of the topmost and lowermost coil of these groups respectively with a slight amount of clearance (for example, about 1 to 3 mms at each head face). It is thus ensured that during operation the coils, particularly that of the lower tine 83, can deflect only to a limited extent. The sleeves 87 are clamped to the tine carrier 86 by means of a bolt passed through the bore of the sleeve and bearing on the outer head faces. The disposition is such that the groups of coils 84 and 85 are basically pivotable about the center lines of the sleeves 87. During the run through the foremost part of the tine path this center line is substantially parallel to the rotary axis.

The tine carrier 86 has an outermost part located between the coils and extending substantially horizontally during operation, and a downwardly and inwardly directed part, the end of which is rigidly secured to sleeves which are freely pivotable about a pivot shaft 88. The center line of this pivot shaft in this embodiment is directed tangentially, viewed in plan, but as stated above it may be at an angle to a plane at right angles to the rotary axis.

With respect to the rim 38 the direction of the pivot shaft 88 is fixed by means of upwardly and outwardly inclined lugs 89.

The proximal loops of the groups of coils 84 and 85 are prolonged in a bracket 90 of the same material. Inside the bracket 90 is located part of a setting member 91, which extends substantially horizontally to the outside during operation and has at least two notches 92 and 93 at the upper outer edge. The bracket 90 is located in one of these notches during operation.

The setting member 91 is pivotable about the centre line of a pivot shaft 94 journalled in the outermost part of the tine carrier 86. A torsion spring 95 surrounding the pivot shaft 94 loads the setting member 91 in upward direction so that the upper limb of the bracket 90 is forcibly pressed into one of the notches 92 or 93. The force of the spring 95 urges the groups of coils against the conical sleeves 87.

The flexible wall 41, viewed from the side (FIG. 10), is approximately located on the outer side of the group of coils 84. The bottom of the wall 41 is located at a short distance above the top of each group of coils 84, as will be seen from FIG. 10. The lower edge of the wall 41 is reinforced by means of a tubular seam 96 also made from flexible material. Viewed in plan, the seam 96 projects out of the wall 41.

A potential movement of the group of tines is limited in upward and downward direction by stops 97 and 98 respectively.

During operation the group of tines 81 shown in FIG. 10 operates as described above for the preceding embodiments. The location of the center of gravity of the group of tines 81 with respect to the pivot shaft 88 substantially corresponds with that of the center of gravity 62 with respect to the pivot shaft 53 of FIG. 4. In the position furthest to the rear with respect to the direction of rotation B, indicated in FIG. 9 by solid lines and being suitable for working dry crop, the tines 82, 83 are at an angle of more than 45° and preferably of about 50° to 55° to the radial line passing through the center line of the coils 84, 85. With travelling speeds between 6 and 12 kms/hour, a diameter of about 3 meters and a speed of rotation of 70 to 80 rev/min this position corresponds to an angle between the tine and a tangential line passing through the tip of the tine to the path described thereby with respect to the ground of about 55° to 70°, when the pivot axis extends tangentially and the tip of the tine lies in a vertical plane containing the axis of rotation of the rake member and directed in the direction of travel A. In this case the upper limb of the bracket 90 is located in the rearmost notch 92.

Particularly in the case of heavy, wet crop it may be desirable to reduce the backwardly directed position of the group of tines, which is suitable for working dry crop. In this case the setting member 91 is manually turned against the force of the spring 95 so that the notch 92 releases the bracket 90. The group of tines is then turned about the center line of the sleeves 87 in the direction of rotation B until the upper limb of the bracket 90 arrives over the notch 93. When the setting member 91 is released, the new, backwardly directed position indicated by broken lines in FIG. 9 is fixed. In this position the tines of FIG. 9 are at an angle of about 20° to 25°, preferably about 23°, to the aforesaid radial line, which corresponds with an angle between the tine and a tangential line passing through the tip of the tine to the path described by the tip with respect to the ground of about 75° to 90° (when the pivot axis is tangential and the tip of the tine lies in a vertical plane containing the axis of rotation of the rake member and directed in the direction of travel A) at travelling speeds between 6 and 12 kms/hour, a diameter of about 3 meters and a speed of rotation of about 70 to 80 rev/min.

As compared with an outwardly inclined position relative to the direction of rotation of the pivot axis of the group of tines as shown in FIGS. 5 and 8, a tangential position of the pivot shaft 88 as shown in FIG. 9 ensures that the group of tines 81 reacts to ground forces in a more rigid manner, since in a tangential position of the pivot shaft 88 these ground forces, to which the centrifugal force contributes, have a smaller torque component than in the position of the pivot axis in the preceding Figures. This may be important for raking wet crop from between the stubble.

Since the rake member shown in FIGS. 9 and 10 is also driven at a low speed of 70 to 80 rev/min the flexible wall 41, as in the preceding embodiments, is only moderately stretched so that this wall is relatively slack. It is, therefore, useful to arrange the groups of tines directly and rigidly on the rim 38 so as to be pivotable.

When large quantities of crop per unit time are to be worked and part of this crop bears on the wall 41, local indents are made in the wall, which engage the crop and operate as catchers. The lower region of the wall locally bends downwardly and inwardly (see the broken lines in FIG. 10) so that it supports the engaged crop in downward and outward direction.

While various features of the raking machines that have been described, and that are illustrated in the drawings, will be set forth in the following claims as inventive features, it is to be noted that the invention is not necessarily limited to these features and that it encompasses all of the features that have been described both individually and in various combinations.

We claim:

1. A raking machine movable over the ground comprising at least one tined rake member rotatable about an upwardly and forwardly extending axis and driving means connected to rotate said member about said axis, tines pivotably mounted adjacent the outer perimeter of the rake member and said tines with mountings being freely pivotable outwardly to operative positions about generally horizontal axes responsive to centrifugal forces during rotation, each tine being inclined rearwardly in its operative position with respect to a plane that contains the axis of rotation and the pivot point of the tine mounting to the rake member, the center of gravity of said tine mounting being located outwardly from said pivot point during rotation and said tine extending downwardly from that point towards the ground during at least the major part of the rearmost 180° sector of its rotational path, said tine being positioned to contact the ground and rake crop for at least the major part of the foremost 180° sector of its path, said tine being pivotable upwardly about said pivot point responsive to contact with the ground, the angle of said tine to said plane changing during contact with the ground during travel.

2. A raking machine as claimed in claim 1, wherein said angle is between about 55° and 85°.

3. A raking machine as claimed in claim 1, wherein said rotary axis extends upwardly at an angle between about 3° and 7° to the vertical.

4. A raking machine as claimed in claim 1, wherein the tip of said tine passes through two planes at an angle to one another.

5. A raking machine as claimed in claim 4, wherein one of said planes is rearwardly and upwardly inclined and the other plane approximately coincides with the plane of the ground surface.

6. A raking machine as claimed in claim 5, wherein the line of intersection of the two planes is located substantially in the vertical plane passing through said rotary axis at right angles to the direction of machine travel.

7. A raking machine as claimed in claim 6, wherein during its travel through said other plane, the tip of said tine is urged against the ground by centrifugal force.

8. A raking machine as claimed in claim 6, wherein the angle between said tine and a plane at right angles to said rotary axis constantly varies during the travel of the tine through said other plane.

9. A raking machine as claimed in claim 1, wherein said tine is one of a group of two tines and said tines are fastened to one another through coils.

10. A raking machine as claimed in claim 9, wherein the tines of each group are substantially parallel to one another.

11. A raking machine as claimed in claim 1, wherein the tines of said rake member are positioned to deposit crop in the form of a swath to one lateral side of said member, guide means comprising two groups of superjacent bars being located laterally outward from said side, said bars extending to partly overlap one another as viewed from aside.

12. A raking machine as claimed in claim 1, wherein the tines are positioned to deposit crop to one side of the rake member in the form of a swath, a guide member positioned adjacent said side and said guide member being directed substantially in the direction of machine travel, said guide member being pivotably connected to said machine to turn about a pivot axis that is downwardly inclined to the rear.

13. A raking machine as claimed in claim 12, wherein said machine has a frame with coupling means for hitching the machine to the three-point lifting device of a tractor and supporting ground wheels below the rake member that are adjustable to support said rake member at different heights above the ground.

14. A raking machine as claimed in claim 12, wherein a further guide member is pivoted to the frame to extend rearwardly and outwardly from the axis of rotation, the front of said further member having bars substantially joining the path described by the tips of said tines.

15. A raking machine as claimed in claim 1, wherein there are two rake members drivably connected for rotation in the same direction of rotation, the rotary axis of one of said rake members being located in front of that of the other rake member, when viewed in a direction perpendicular to the direction of machine travel.

16. A raking machine as claimed in claim 1, wherein each tine is in a group comprised of two tines positioned one above the other and said group is adjustable about an upwardly extending axis in at least two operative positions, the pivot axis of said group being directed tangentially to a circle centered on the axis of rotation.

17. A raking machine as claimed in claim 16, wherein, viewed in plan, in a first position the tines extend at an angle between about 55° and 70° to a line tangential to the path of the lower tine tip with respect to the ground and passing through said tip.

18. A raking machine as claimed in claim 17, wherein, viewed in plan, in a second position, the tines extend at an angle between about 75° and 90° to a line tangential to the path of the lower tine tip with respect to the ground and passing through the tip of the tine.

19. A raking machine as claimed in claim 1, wherein the pivot axis of said tine is located substantially in a plane at right angles to said rotary axis and the pivot axis extends tangentially to a circle centered on the axis of rotation.

20. A raking machine movable over the ground comprising at least one tined rake member rotatable about an upwardly and forwardly extending axis and driving means connected to rotate said member about said axis, tines pivotably mounted adjacent the outer perimeter of the rake member and said tines with mountings being freely pivotable outwardly to operative positions about generally horizontal axes responsive to centrifugal forces during rotation, each tine being inclined rearwardly in its operative position with respect to a plane that contains the axis of rotation and the pivot point of the tine mounting to the rake member, the center of gravity of said tine mounting being located outwardly from said pivot point during rotation and said tine extending downwardly from that point towards the ground during at least the major part of the rearmost 180° sector of its rotational path, said tine being positioned to contact the ground and rake crop for at least the major part of the foremost 180° sector of its path, a circular, uninterrupted flexible wall mounted on said member and being rotatable with the tines, said wall being positioned substantially above the tines to increase the crop handling capacity of the machine.

21. A raking machine as claimed in claim 20, wherein, viewed in plan, said wall surrounds the tine pivotal connections and extends substantially up to the top of said connections.

22. A raking machine movable over the ground comprising at least one tined rake member rotatable about an upwardly and forwardly extending axis and driving means connected to rotate said member about said axis, tines pivotably mounted adjacent the outer perimeter of the rake member and said tines with mountings being freely pivotable outwardly to operative positions responsive to centrifugal forces during rotation, the diameter of the rake member defined by the path described by outer tine tips during operation being 2 to 3.3 meters, viewed in plan, each tine being inclined rearwardly in its operative position with respect to the direction of rotation, the center of gravity of said tine mounting being located outwardly from said pivot point during rotation and said tine extending downwardly from that point towards the ground during at least the major part of the rearmost 180° sector of its rotational path, said tine being positioned to contact the ground for at least the major part of the foremost 180° sector of its path, the foremost tine of the machine, when the machine is travelled at a speed between 6 and 12 kms/hour with the rotation of the driven rake member being between 70 and 80 rev/min., at any moment being inclined at an angle of about 45° to 90°, again viewed in plan, to a line passing through the tip of said tine and tangential to the path of that tip with respect to the ground, when the tine tip is located in a vertical plane containing the rotary axis of said rake members and extending in the direction of machine travel.

23. A raking machine as claimed in claim 22, wherein the value of the product of the diameter of the rake member, measured at the tips of the tines, and the speed of rotation thereof during operation, divided by the travelling speed of the machine over the ground, is between about 0.95 to 1.60.

24. A raking machine as claimed in claim 23, wherein said value is 1.20 to 1.55.

* * * * *